US009191926B2

(12) United States Patent
Al Housami

(10) Patent No.: US 9,191,926 B2
(45) Date of Patent: *Nov. 17, 2015

(54) METHOD AND BASE STATION FOR AUTOMATIC CARRIER SELECTION

(71) Applicant: Ubiquisys Limited, Swindon (GB)

(72) Inventor: Housam Al Housami, Swindon (GB)

(73) Assignee: Ubiquisys Limited, Swindon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/103,693

(22) Filed: Dec. 11, 2013

(65) Prior Publication Data

US 2014/0179333 A1 Jun. 26, 2014

Related U.S. Application Data

(63) Continuation of application No. 13/578,558, filed as application No. PCT/GB2011/050259 on Feb. 11, 2011, now Pat. No. 8,630,655.

(30) Foreign Application Priority Data

Feb. 12, 2010 (GB) .................................. 1002397.6

(51) Int. Cl.
*H04W 72/00* (2009.01)
*H04W 72/04* (2009.01)
*H04W 16/14* (2009.01)
*H04W 84/04* (2009.01)
*H04W 52/04* (2009.01)

(52) U.S. Cl.
CPC .............. *H04W 72/04* (2013.01); *H04W 16/14* (2013.01); *H04W 52/04* (2013.01); *H04W 84/045* (2013.01)

(58) Field of Classification Search
CPC ..... H04W 16/00; H04W 16/02; H04W 16/14; H04W 72/0453; H04W 72/02; H04W 72/082
See application file for complete search history.

(56) References Cited

U.S. PATENT DOCUMENTS 8,325,683 B2 12/2012 Yokoyama
2002/0005755 A1* 1/2002 Nam et al. .................... 330/133
(Continued)

FOREIGN PATENT DOCUMENTS

EP 1 732 338 12/2006
EP 2104384 A1 9/2009
(Continued)

OTHER PUBLICATIONS

Meshkati, F., et al., "Mobility and Capacity Offload for 3G UMTS Femtocells", Global Telecommunications Conference, Nov. 30, 2009, pp. 1-7.
Yavuz, M., et al., "Interference Management and Performance Analysis of UMTS/HSPA + Femtocells", IEEE Communications Magazine, IEEE Service Center, vol. 47, No. 9, Sep. 1, 2009, pp. 1-2-109.
Claussen, H., "Co-Channel Operation of Macro- and Femtocells in a Hierarchical Cell Structure", Int J. Wireless Information Networks, vol. 15, No. 3-4, Sep. 25, 2008, pp. 137-147.
(Continued)

*Primary Examiner* — Nathan Mitchell
*Assistant Examiner* — Shantell L Heiber
(74) *Attorney, Agent, or Firm* — Weaver Austin Villeneuve & Sampson LLP

(57) ABSTRACT

A femtocell basestation selects its carrier frequency by detecting a carrier used by at least one other basestation in its network, and selecting its own carrier frequency such that it partially overlaps with the detected carrier. The downlink power of the femtocell basestation is set based on the degree of overlap between the selected carrier and the detected carrier, so that a user equipment having a connection to the other basestation is forced to search for the selected carrier.

9 Claims, 5 Drawing Sheets

(56) References Cited

U.S. PATENT DOCUMENTS

| | | | |
|---|---|---|---|
| 2002/0191686 A1* | 12/2002 | Snaddon et al. | 375/224 |
| 2007/0021151 A1 | 1/2007 | Mori et al. | |
| 2007/0275727 A1* | 11/2007 | Lee et al. | 455/442 |
| 2008/0051090 A1* | 2/2008 | Kobayashi | 455/436 |
| 2009/0207746 A1* | 8/2009 | Yuan et al. | 370/252 |
| 2010/0008317 A1 | 1/2010 | Bhattad et al. | |
| 2010/0261467 A1* | 10/2010 | Chou et al. | 455/422.1 |
| 2012/0099542 A1 | 4/2012 | Yuk et al. | |
| 2012/0252521 A1 | 10/2012 | Nagaraja et al. | |
| 2013/0053049 A1 | 2/2013 | Housami | |

FOREIGN PATENT DOCUMENTS

| | | |
|---|---|---|
| JP | A 2011-527877 | 11/2011 |
| WO | WO02/03717 A2 | 1/2002 |
| WO | WO 2010/006289 | 1/2010 |
| WO | WO2010/011166 A1 | 1/2010 |

OTHER PUBLICATIONS

Motorola et al., "Merged Text Proposals for HNB TR 25.9xx", 3GPP Draft, Nov. 19, 2008.

International Search Report dated, Apr. 29, 2011, Application No. PCT/GB2011/050259.

UK Examination Report dated Feb. 26, 2013 for GB Application No. GB1002397.6.

Office Action dated Jan. 15, 2013 issued in U.S. Appl. No. 13/578,558.

Notice of Allowance dated Sep. 11, 2013 issued in U.S. Appl. No. 13/578,558.

JP Office Action dated Nov. 4, 2014 for JP Application No. 2012-552474.

Keiji Tachikawa, W-CDMA Mobile Communication System, Maruzen Publishing Co., Ltd, Jun. 25, 2001, pp. 94-95.

* cited by examiner

METHOD AND BASE STATION FOR AUTOMATIC CARRIER SELECTION

This application is a continuation of U.S. patent application Ser. No. 13/578,558, filed on Oct. 26, 2012, which is a 371(c) application of PCT/GB2011/050259 filed Feb. 11, 2011, entitled "METHOD AND BASE STATION FOR AUTOMATIC CARRIER SELECTION", which claims priority to GB 1002397.6, filed Feb. 12, 2010, and entitled "CARRIER SELECTION", each of which prior application is hereby incorporated by reference and for all purposes.

This invention relates to a basestation, for use in a cellular mobile communications network, and in particular to the way in which such a basestation can select its operating carrier frequency.

Femtocell basestations are known, in the form of access points that provide mobile coverage in areas where coverage is problematic, for example indoors. Such devices are typically intended to run autonomously, and thus have many self-configuration capabilities.

Femtocell basestations are expected to complement the existing macrolayer coverage, so that the same devices should be able to attach to and use macrolayer basestations and femtocell basestations, depending on their location. In order for mobile users to be able to roam between the macro layer and the femto layer, there has to be a mechanism by which a handset that is attached to a macrolayer basestation can search for femtocell coverage. Then, when femtocell coverage is detected, the handset can attach to the femto layer and get the benefits of the improved coverage and additional capacity provided by the femtocell basestations.

When a femtocell basestation has the same radio channel frequency as the macro layer in its immediate vicinity, mobility between the macro layer and the femtocell is easily achieved. Because the two layers share the same frequency, a mobile camped on (or connected to) the macro network will experience a degradation of macro quality when it is in the vicinity of a co-channel femtocell. This degradation will trigger the mobile to search for better cells in the area as defined in the Neighbour List. Thus, the co-channel deployment will force the mobile to search and find femtocells without having to change mobility parameters on the macro network. However, the co-channel deployment creates interference between the two layers which can be harmful, particularly for a mobile user that is unauthorised to use a femtocell that is causing interference in the macro layer or no service at all because of from a femtocell nearby. Unauthorised handsets can also experience additional disadvantages, particularly if they are R6 compliant. When such a device is rejected on the femto layer, the channel is barred for up to 300 seconds, which means that the handset will not be able to use the macro network for that duration, even if the macro quality is adequate.

When the femtocell basestations in a network are allocated a dedicated frequency, mobility between the macro layer and the femto layer is achieved in a different way. In the Idle mode, inter-frequency cell reselection parameters on the macro network instruct the handsets to search for specific scrambling codes used by the femtocell basestations. In the connected mode, the macro network instructs the handsets to go into "compressed mode", in order to search for and measure any cells that happen to be using the femtocell frequency. In compressed mode, the handset periodically stops transmission, and momentarily tunes itself to another frequency to measure the quality of that frequency. The use of a dedicated frequency for the femtocell basestations eliminates the interference problem. However, the changes to mobility parameters on the macro network will cause all handsets camped on a macro layer basestation to try to detect the femtocell layer. Using compressed mode across the whole network is usually unacceptable as it leads to capacity and quality problems.

In some cases, the macro layer network has a number of carriers (channels), and therefore, when femtocell basestations are deployed on these carriers, all of the mobility issues described above will appear.

According to the present invention, there is provided a method of operation of a basestation in a mobile communications network, wherein the mobile communications network comprises a plurality of other basestations, each operating in a respective carrier frequency band, the method comprising:

detecting a carrier in use by at least one of the other basestations, wherein the detected carrier has an effective bandwidth, and selecting a carrier having said effective bandwidth for use in the basestation, based on the detected carrier in use by the other basestation, such that the selected carrier partially overlaps with the detected carrier in use by the other basestation.

According to a second aspect of the present invention, there is provided a basestation adapted to operate in accordance with the method of the first aspect.

For a better understanding of the present invention, and to show how it may be put into effect, reference will now be made, by way of example, to the accompanying drawings, in which.

Figure 1:
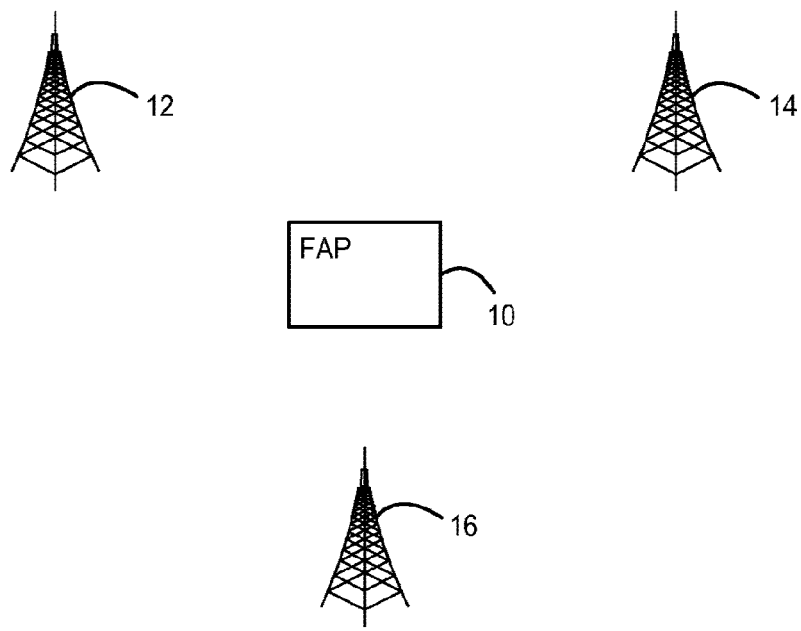
FIG. 1 illustrates a part of a cellular communications network operating in accordance with an aspect of the present invention.

FIG. 1 shows a part of a cellular communications network. At this level of generality, the network is conventional, and will be described only so far as is necessary for an understanding of the present invention. In the illustrated cellular network, a femtocell basestation, or femtocell access point (FAP) 10 has been deployed. The FAP 10 is in the vicinity of three macro layer cellular basestations 12, 14, 16 within the same cellular network. It will be appreciated that a practical network will include many more basestations, but the present invention can be described sufficiently without illustrating additional basestations.

Figure 2:
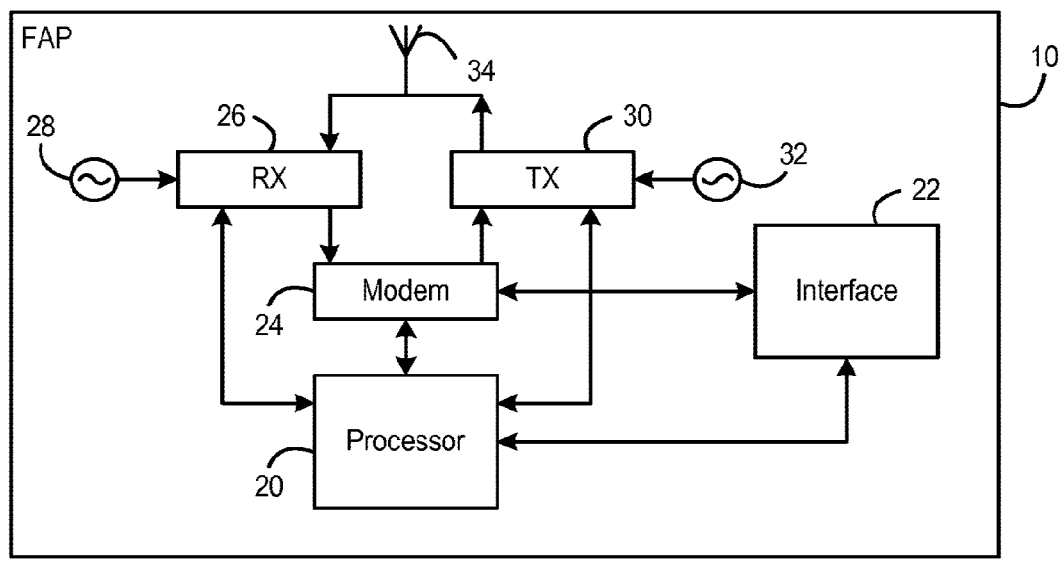
FIG. 2 is a block schematic diagram, illustrating a femtocell basestation in accordance with an aspect of the present invention.

FIG. 2 illustrates in more detail the FAP 10. Again, at this level of generality, the FAP 10 is known, and will be described only so far as is necessary for an understanding of the present invention. The FAP 10 operates under the control of a processor 20, which monitors, and controls the operation of, the other components of the FAP 10. The communication with the core network of the cellular network operator is typically over the internet, by means of an interface 22. Signals to and from the interface 22 for communication over the wireless interface to mobile devices or other user equipment are passed to a modem 24, which puts the signals into the appropriate format, based on the relevant cellular standard. The invention will be described further with reference to a FAP 10 operating in accordance with the UMTS cellular standard, but it will be apparent that the invention can be applied to any other appropriate standard.

Signals received by the FAP 10 over the wireless interface are passed to conventional receive (Rx) circuitry 26, operating at a frequency that is derived from a signal received from an oscillator 28. Signals for transmission over the wireless interface are passed to conventional transmit (Tx) circuitry 30, operating at a frequency that is derived from a signal received from an oscillator 32. The oscillators 28, 32 are shown here as separate, but there may instead be a single oscillator, with the Rx circuitry 26 and the Tx circuitry 30 deriving the relevant receive and transmit frequencies from that single oscillator. Connected to the Rx circuitry 26 and the Tx circuitry 30 is an antenna 34.

Figure 3:
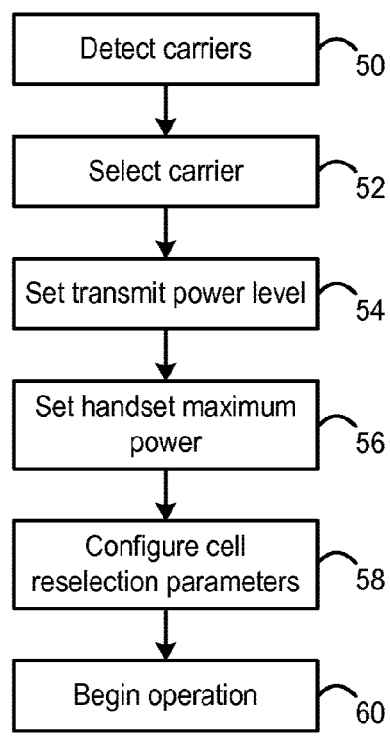
FIG. 3 is a flow chart, illustrating a method in accordance with an aspect of the present invention.

FIG. 3 is a flow chart, illustrating a process performed by the FAP 10, under the control of the processor 20, during the initialisation of the device. The same process can be carried out at regular intervals while the FAP 10 is in operation, to take account of changes in the signals transmitted by macro layer basestations in the vicinity.

In step 50, the FAP 10 attempts to detect downlink transmissions from macrocell basestations in the cellular network. In step 52, the FAP selects a channel. The selection is based on information that is obtained in step 50.

Thus, the macrolayer basestations are typically all operating on carriers that are determined by the cellular network operator as part of its network planning. For example, two carriers might be allocated to all of the macrolayer basestations in the network. In that case, the FAP 10 might be able to detect one or more macrolayer basestation operating on a first carrier, or might be able to detect one or more macrolayer basestation operating on a second carrier, or might be able to detect macrolayer basestations operating on the first carrier and the second carrier. In one embodiment, the FAP 10 is able to download information from a management system provided by the cellular network operator, informing it what action to take in any of these situations.

For example, the FAP 10 might have downloaded information, instructing it that: if it is only able to detect one or more macrolayer basestation transmitting on a first carrier, it should transmit on a third carrier; if it is only able to detect one or more macrolayer basestation transmitting on a second carrier, it should transmit on a fourth carrier; or, if it is able to detect macrolayer basestations transmitting on the first carrier and the second carrier, it should transmit on a fifth carrier. In each case, there is a partial overlap between the carrier on which the FAP 10 transmits and the carrier or carriers on which the detected macrolayer basestation transmits.

In another embodiment, the FAP might select a carrier based on a different algorithm, depending on the number of macrolayer basestations that it is able to detect, the carriers that they are transmitting on, and the strengths of the detected macrolayer carriers.

For example, the FAP might determine a channel offset, and then select a carrier that is separated from the carriers of the detected macrolayer basestations by that carrier offset. Again, the channel offset is such that there is a partial overlap between the carrier on which the FAP 10 transmits and the carrier or carriers on which the detected macrolayer basestation transmits.

Having selected the carrier that it will use for its downlink transmissions, the FAP 10 is readily able to determine the carrier to be used for uplink transmissions, because there is a fixed relationship between the downlink and uplink carriers for all devices in the UMTS system. In the UMTS system, the channel raster is 200 kHz, that is, the available frequency channels are spaced apart by 200 kHz, and each channel is given a number, the UTRA Absolute Radio Frequency Channel Number (UARFCN), where the frequency of a channel is its UARFCN multiplied by 200 kHz.

In UMTS, transmitters and receivers operate using carriers, which are nominally 5 MHz wide. That is, any transmitter and receiver will be operating on a carrier, which is identified by the UARFCN that corresponds to the centre frequency of the carrier, but the limits on frequency selectivity in the various filters, etc mean that the carrier will contain components over a frequency range of 5 MHz centred on that centre frequency.

Figure 4:
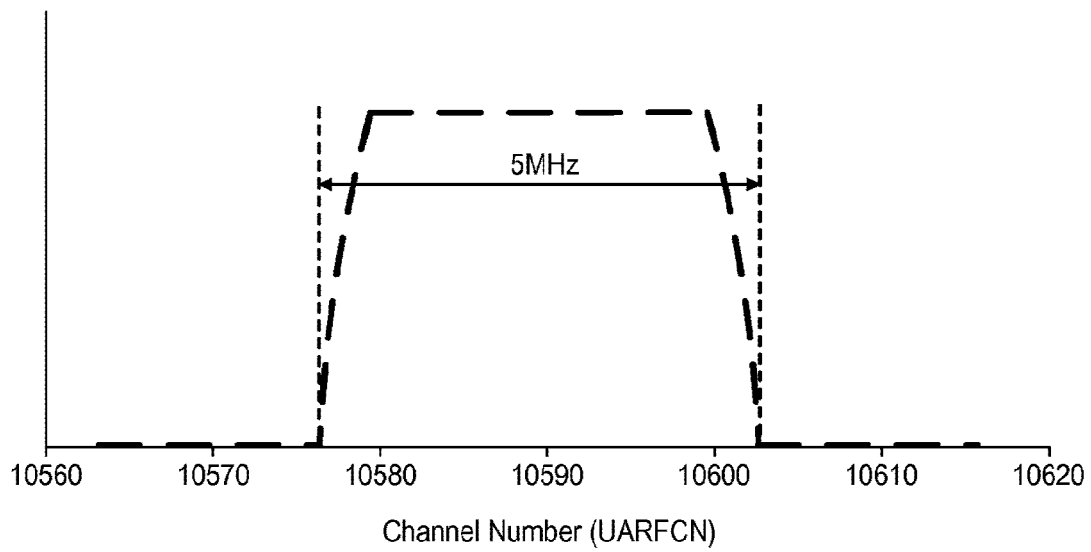
FIG. 4 illustrates a frequency allocation in an aspect of the invention.

Thus, FIG. 4 shows a situation where a basestation is transmitting on channel number 10590. That is, it is generating signals across a bandwidth of approximately 5 MHz centred on 2118 MHz, which is the product of the channel number, 10590, and 200 kHz.

Figure 5:
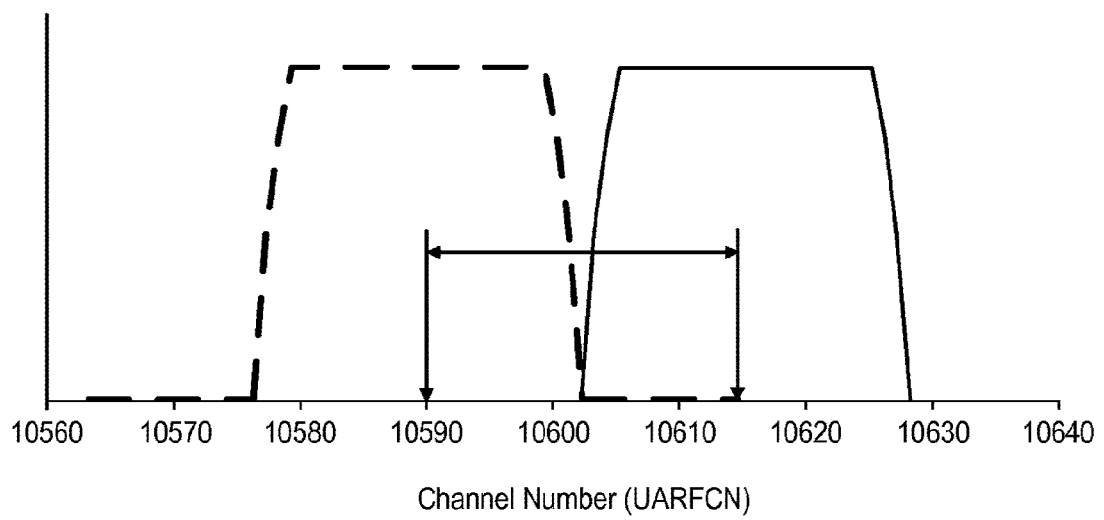
FIG. 5 illustrates a frequency allocation in another aspect of the invention.

FIG. 5 shows a typical situation where there are two basestations operating on two different carriers, with a first basestation is transmitting on channel number 10590 and a second basestation transmitting on channel number 10615. That is, the first basestation is generating signals across a bandwidth of approximately 5 MHz centred on 2118 MHz, while the second basestation is generating signals across a bandwidth of approximately 5 MHz centred on 2123 MHz, which is the product of the channel number, 10590, and 200 kHz.

Figure 6:
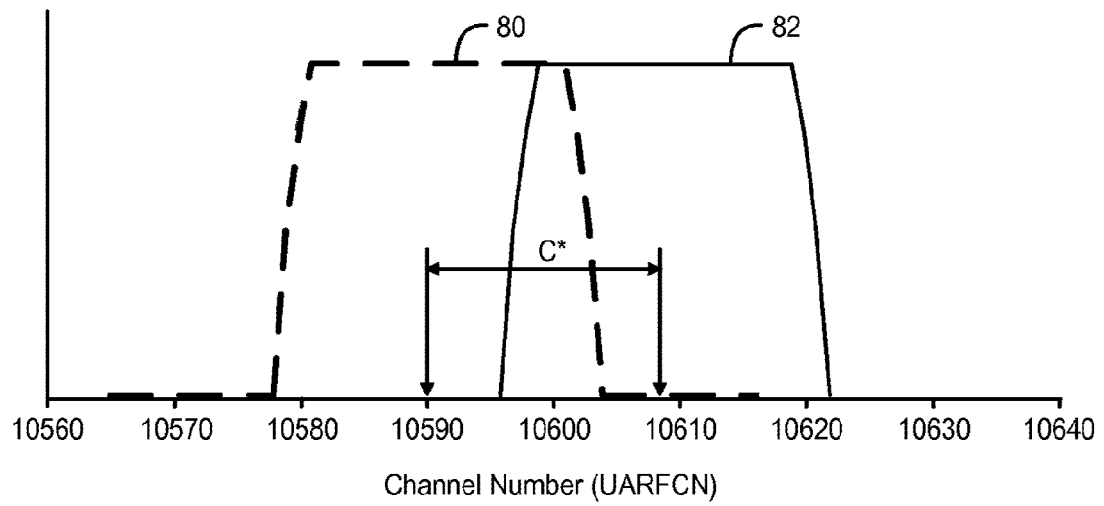
FIG. 6 illustrates a frequency allocation in yet another aspect of the invention.

FIG. 6 shows the result of step 52, in the case where the FAP 10 is able to detect only one or more macrolayer basestation transmitting on the carrier 80 centred on channel number 10590. Based on the information provided by the network operator's management system, the FAP 10 selects the carrier 82, centred on channel number 10608 for its own transmissions. There is thus a channel offset $C^*$, where $C^*=18$ in this illustrated example, between the centre frequencies of the two carriers.

The difference between the centre frequencies of the two carriers is the channel offset multiplied by 200 kHz. Thus, where the channel offset is selected to be less than 25, the difference between the centre frequencies is less than 5 MHz. As each carrier has an effective bandwidth of 5 MHz, there is a partial overlap between the carriers 80, 82.

Figure 7:
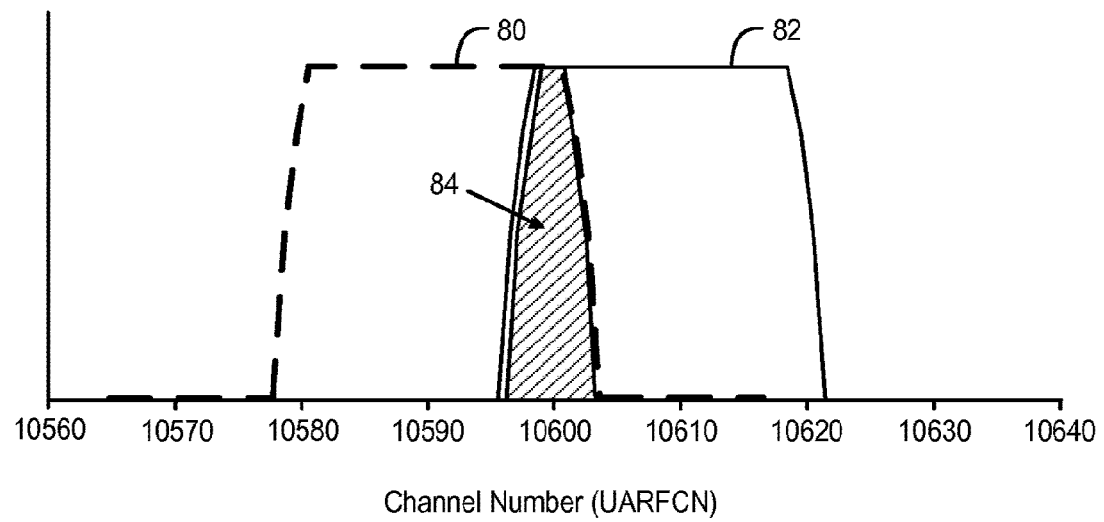
FIG. 7 illustrates a frequency allocation in yet another aspect of the invention.

FIG. 7 shows the area 84 of overlap between the carriers 80, 82.

The difference between the centre frequencies of the two carriers is the channel offset multiplied by 200 KHz. Thus, where the channel offset is selected to be less than 25, the difference between the centre frequencies is less than 5 MHz. As each carrier has an effective bandwidth of 5 MHz, there is a partial overlap between the carriers 80, 82.

Figure 8:
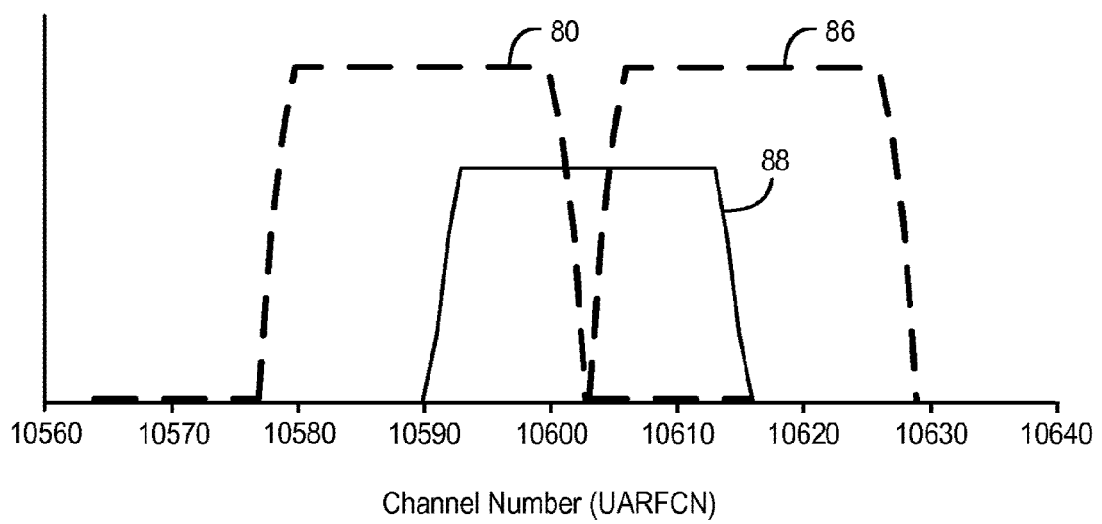
FIG. 8 illustrates a frequency allocation in yet another aspect of the invention.

FIG. 8 shows the result of step 52, in the case where the FAP 10 is able to detect one or more macrolayer basestation transmitting on the carrier 80 centred on channel number 10590, and one or more macrolayer basestation transmitting on the carrier 86 centred on channel number 10615. It will be seen that the difference between the centre frequencies of the carriers 80, 86 is 5 MHz, which is a common situation when a network operator provides two carriers for its macrolayer basestations. In this case, the FAP 10 selects a carrier that partially overlaps with both of the carriers 80, 86.

Specifically, in this example, based on the information provided by the network operator's management system, the FAP 10 selects the carrier 88, centred on channel number 10603 for its own transmissions. There is thus a channel offset $C^{*1}$, where $C^{*1}=13$ in this illustrated example, between the centre frequencies of the carriers 80 and 88, and a channel offset $C^{*2}$, where $C^{*2}=12$ in this illustrated example, between the centre frequencies of the carriers 86 and 88.

Again, these two channel offsets are selected to be less than 25, and so the differences between the pairs of centre frequencies are less than 5 MHz. As each carrier has an effective bandwidth of 5 MHz, there is a partial overlap between the carriers 80 and 88, and a partial overlap between the carriers 86 and 88.

Thus, the selected carrier straddles the guard band that separates the carriers 80, 86.

The selection of a carrier that partially overlaps with a macrolayer carrier combines the benefits of operating on the same carrier as the macrolayer basestations in the vicinity and of operating on a separate carrier from the macrolayer basestations, while minimising the disadvantages.

Thus, while there is some interference with the macrolayer carrier, the interference is limited. In fact, the degree of interference is a function of the degree of overlap between the two carriers. A larger channel offset reduces the amount of interference. The channel offset is typically at least 4, i.e. the centre frequency spacing is at least 800 KHz. At the same time, the channel offset is typically less than 21, i.e. the centre frequency spacing is typically less than 4.4 MHz. This means that the amount of interference does not adversely affect signal reception for most users, but does create a sufficient level of interference that degrades the macro carrier in a small region around the femtocell, and thus forces the user to search for and reselect to the femto layer. Because the interference is substantially less than in the case of the shared carrier, this small region around the femtocell can in practice be made small enough that a user moving into the coverage area of the femtocell will only start searching for the femtocell when it is close to the femtocell.

By configuring the inter-frequency cell reselection parameters on the macro network, only handsets that experience a certain level of quality degradation will then search for the femto carrier. This substantially decreases the proportion of handsets that are searching for the femto layer. It means also that the proportion of connected handsets (in call) that need to be put in compressed mode to search for the femto carrier is substantially reduced. This increases average battery life for users, and minimises the reduction in the macrolayer capacity caused by the use of compressed mode.

Also, selecting a partially overlapping carrier for use by a FAP means that unauthorised macrolayer users who attempt to access the FAP and get rejected are more likely to find a macro layer basestation with acceptable quality to return to. In addition, the channel blocking procedure, whereby a user is prevented from using a carrier on which it has been rejected, has no effect on the availability of the macro layer, because the blocked carrier is different from the one used by the macro network.

Having selected a carrier, the process shown in FIG. 3 passes to step 54, in which it sets the transmit power levels for the FAP 10. Specifically, based on the measured Received Signal Code Power (RSCP) levels of the detected macro layer carriers, the FAP 10 chooses a downlink power setting that will degrade the macro signal quality (Ec/Io) to a pre-determined level at a certain pre-determined distance (or path loss) and for the chosen channel offset. The FAP has to create an adequate level of interference that causes the handset to search for the FAP when it is at a certain distance (e.g. 2-3 meters) from the FAP while, at the same time, ensuring that the interference generated by the FAP should not cause a pronounced quality degradation to the macro layer.

For example, the transmission power level Tx power may be determined according to the equation:

$$Tx\ power = measured\ RSCP + PL - Ec/Io + LF + CF,$$

where:
measured RSCP is the RSCP level of the strongest detected signal from any macrolayer basestation;

PL is the desired value for the path loss at the point at which the transition between the macro layer and the femto layer takes place, and may for example be set to 50 dB, so that the transition only occurs close to the FAP 10;

Ec/Io is the macro layer Ec/Io quality at which the UE is triggered to search for the FAP UARFCN, and the value of this can be read by the FAP 10 off the macro layer broadcast channel;

LF is a loading factor that takes into account the loading difference between the two layers, as well as the proportion of FAP power allocated to the Common Pilot Channel (CPICH); and CF is a correction factor that is a function of the channel offset C* between the FAP 10 and the adjacent macro layer basestation.

In principle, a larger correction factor should be applied for larger values of the channel offset. However, the power setting procedure in the FAP can also take into consideration the level of coverage provided by the FAP to FAP UEs, the interference caused by the FAP to any other adjacent/overlapping carriers, and the maximum power capabilities of the FAP.

For purposes of example and illustration only, the following relationship between the channel offset C* and the correction factor CF is possible:

| Channel offset | Correction Factor (dB) |
|---|---|
| <8 | 0 |
| 8 | 1.5 |
| 9 | 2.5 |
| 10 | 3.0 |
| 11 | 7 |
| 12 | 10 |
| >12 | 13 |

Having set the transmit power level, the procedure of FIG. 3 passes to step 56, in which the FAP 10 also sets the maximum power allowed by handsets in the uplink. The FAP has to control the interference generated by the FAP UEs into the partially overlapping macro layer carrier.

For example, in one embodiment, the FAP calculates the path loss to the nearest macro layer base station. This is based on its measurement of the macro RSCP and the Transmit Power of the macro layer pilot signal, which is known from transmissions over the broadcast channels. The FAP then calculates the maximum co-channel transmit power that will create a pre-configured level of uplink noise rise at the nearest macro layer base station. The FAP then uses another mapping table, similar to the one above, to correct the difference in power for an offset channel. The FAP then broadcasts the calculated value for the maximum uplink power over its broadcast channel.

Where the FAP carrier partially overlaps with two carriers in the macro layer, it can adjust the downlink and uplink powers in steps 54 and 56 based on measurements of the stronger overlapping carrier, or based on a measurement of one particular overlapping carrier notified by the management system, or based on an averaging function that uses measurements from the two overlapping carriers.

The procedure of FIG. 3 passes to step 58, in which the FAP 10 configures the various inter-frequency cell reselection parameters towards the offset macro carrier(s). As an example of this, the FAP configures the compressed mode thresholds to cause Femto handsets to search for and handout to macro sites on offset carriers. The FAP 10 has to configure the inter-frequency cell reselection parameters in order to enable seamless transition from the femto layer to the macro layer at the right boundary. The configuration is specific to that particular FAP because it is dependent on the strength of the macro signal at that location, and is also dependent on the desired extent of coverage of the FAP.

Having set the various parameters as described, the process passes to step 60, and the FAP 10 is then able to begin operation.

Thus, the femto layer configuration uses a UMTS channel which is spaced less than 5 MHz to the adjacent macro channel. The femto layer configuration uses a carrier that overlaps one or two macro carriers. This generates a pre-determined and controlled level of interference. The self-configuring FAP adjusts its power settings based on a measurement on an adjacent and overlapping carrier. The self-configuring FAP controls the power of connected handsets based on measurements on an adjacent and overlapping carrier. The self-configuring FAP adjusts reselection parameters based on measurements on an adjacent and overlapping carrier. The FAP instructs UEs in connected mode to measure one or more UARFCNs that belong to overlapping carriers belonging to the macro network using compressed mode.

This therefore provides a mechanism to deploy femtocells without waiting for a newer generation of handsets or equipment.

The invention claimed is:

1. A method of operation of a basestation in a cellular communications network, the method comprising, in the basestation:
   detecting signals transmitted by other basestations of the cellular communications network;
   identifying carrier frequencies on which the detected signals are being transmitted by the other basestations;
   selecting a carrier for transmissions from the basestation, wherein the carrier selected for transmissions from the basestation has a bandwidth that partially overlaps with the carrier frequencies on which the detected signals are being transmitted by the other basestations; and
   setting a maximum downlink power for transmissions from the basestation, wherein the maximum downlink power is set based at least in part on a frequency offset between (1) a centre frequency of the selected carrier and (2) one of the identified carrier frequencies on which the detected signals are being transmitted by the other basestations.

2. A method as claimed in claim 1, further comprising setting a maximum uplink power for transmissions from user equipments attached to the basestation, wherein the maximum uplink power is set based on a frequency offset between a centre frequency of the selected carrier and identified carrier frequencies on which the detected signals are being transmitted by the other basestations.

3. A method as claimed in claim 1, comprising selecting the carrier for transmissions from the basestation, based on the number of macrolayer basestations that it is able to detect, the carriers they are transmitting on, and the strength of the detected macrolayer carriers.

4. A method of operation of a basestation in a cellular communications network, the method comprising, in the basestation:
   detecting signals transmitted by other basestations of the cellular communications network;
   identifying carrier frequencies on which the detected signals are being transmitted by the other basestations;
   selecting a carrier for transmissions from the basestation, wherein the carrier selected for transmissions from the basestation has a bandwidth that partially overlaps with the carrier frequencies on which the detected signals are being transmitted by the other basestations; and
   setting a maximum uplink power for transmissions from user equipments attached to the basestation, wherein the maximum uplink power is set based at least in part on a frequency offset between (1) a centre frequency of the selected carrier and (2) one of the identified carrier frequencies on which the detected signals are being transmitted by the other basestations.

5. A method as claimed in claim 4, comprising selecting the carrier for transmissions from the basestation, based on the number of macrolayer basestations that it is able to detect, the carriers they are transmitting on, and the strength of the detected macrolayer carriers.

6. A method of operation of a femtocell basestation in a mobile communications network, wherein the mobile communications network comprises a plurality of macro layer basestations, each operating in a respective carrier frequency band, the method comprising:
   detecting a carrier in use by at least one of the macro layer basestations, wherein the detected carrier has a bandwidth;
   selecting a carrier having said bandwidth for use in the femtocell basestation, based on the detected carrier in use by the at least one macro layer basestation; and
   setting a downlink power for transmission from the femtocell basestation, wherein a maximum downlink power is set based at least in part on a frequency offset between 1) a center frequency of the selected carrier and 2) a center frequency of the detected carrier in use by the at least one macro layer basestation, characterized in that:
   if it is only possible to detect one or more macro layer basestation transmitting on a first carrier, the selected carrier is a third carrier;
   if it is only possible to detect one or more macro layer basestation transmitting on a second carrier, the selected carrier is a fourth carrier;
   if it is possible to detect macro layer basestations transmitting on the first carrier and the second carrier, the selected carrier is a fifth carrier; and
   if it is possible to detect two adjacent carriers in use by two of the plurality of macro layer basestations, wherein the detected carriers each have said bandwidth and are separated by a guard band, the selected carrier straddles the guard band and partially overlaps with both of the detected carriers.

7. The method of claim 6, wherein, in a mobile communications network in which a channel raster is 200 kHz, and a nominal carrier width is 5 MHz, a center frequency of the selected carrier is spaced apart from a center frequency of the detected carrier in used by the at least one macro layer basestation by a frequency offset in the range of 200 kHz to 4.8 MHz.

8. A method as claimed in claim 6, further comprising setting a maximum uplink power for transmissions from user equipments attached to the basestation, wherein the maximum uplink power is set based at least in part on a frequency offset between (1) a center frequency of the selected carrier and (2) one of a plurality of identified carrier frequencies on which the detected signals are being transmitted by the other basestations.

9. A basestation, for use in a cellular mobile communications network, wherein the cellular mobile communications network comprises a plurality of other basestations, each transmitting signals on respective carrier frequencies, and wherein the basestation is adapted to operate in accordance with the method according to any preceding claim.

\* \* \* \* \*